US008573664B2

(12) United States Patent
Beechie (10) Patent No.: US 8,573,664 B2
(45) Date of Patent: Nov. 5, 2013

(54) PET BARRIER AND COVER (76) Inventor: Kenneth L. Beechie, University Place, WA (US)

( * ) Notice: Subject to any disclaimer, the term of this patent is extended or adjusted under 35 U.S.C. 154(b) by 256 days.

(21) Appl. No.: 12/900,168

(22) Filed: Oct. 7, 2010

(65) Prior Publication Data
US 2011/0023788 A1 Feb. 3, 2011

Related U.S. Application Data (63) Continuation-in-part of application No. 12/102,679, filed on Apr. 14, 2008, now abandoned.

(51) Int. Cl.
*B60J 7/00* (2006.01)
(52) U.S. Cl.
USPC ........................................ 296/24.31; 119/172
(58) Field of Classification Search
USPC ........ 296/24.31, 24.43; 119/172; 197/228.12; 150/154
See application file for complete search history.

(56) References Cited

U.S. PATENT DOCUMENTS

| | | | | |
|---|---|---|---|---|
| 2,228,948 A | * | 1/1941 | Field | 297/229 |
| 3,002,784 A | | 10/1961 | Bagg | |
| 3,759,572 A | * | 9/1973 | Koepke | 297/452.4 |
| 3,895,727 A | * | 7/1975 | Rucker | 414/537 |
| 4,738,480 A | * | 4/1988 | Ward | 296/24.43 |
| 4,943,105 A | * | 7/1990 | Kacar et al. | 296/24.31 |
| 4,960,293 A | | 10/1990 | Bottinick | |
| 5,005,526 A | * | 4/1991 | Parker | 119/751 |
| D316,776 S | * | 5/1991 | Yarus | D3/11 |
| D326,076 S | | 5/1992 | Wiese | |
| D328,519 S | * | 8/1992 | Tom | D3/10 |
| 5,340,005 A | * | 8/1994 | Woods et al. | 224/407 |
| 5,511,710 A | * | 4/1996 | Woods et al. | 224/407 |
| 6,135,635 A | * | 10/2000 | Miller et al. | 383/2 |
| 6,192,628 B1 | | 2/2001 | Pinheiro | |
| 6,193,298 B1 | | 2/2001 | Swersky | |
| 6,257,653 B1 | | 7/2001 | Swersky | |
| 6,652,026 B2 | * | 11/2003 | Toyota et al. | 297/229 |
| 6,796,589 B2 | | 9/2004 | Dolman | |
| 6,923,487 B1 | | 8/2005 | Wang | |
| 6,951,367 B1 | * | 10/2005 | Dinnan | 297/228.12 |

(Continued)

FOREIGN PATENT DOCUMENTS

| | | |
|---|---|---|
| DE | 2448527 A1 | 4/1976 |
| EP | 0288386 A1 | 10/1988 |
| FR | 2598366 A1 | 11/1987 |

OTHER PUBLICATIONS

Depiction of a pet barrier available for sale as early as Apr. 13, 2007.

*Primary Examiner* — Glenn Dayoan
*Assistant Examiner* — Pinel Romain
(74) *Attorney, Agent, or Firm* — Christensen O'Connor Johnson Kindness PLLC (57) ABSTRACT

A cover for use with a pet barrier having a frame with first and second ends includes a body portion sized and shaped to cover at least a portion of the frame and first and second attachment members defined on the body portion. The first attachment member is sized and configured to be releasably secured to one of the first and second ends of the frame, and the second attachment member is sized and configured to be releasably secured to the other of the first and second ends of the frame. The cover further includes a closure assembly configured to selectively secure the second attachment member to the frame.

20 Claims, 10 Drawing Sheets

(56) References Cited

U.S. PATENT DOCUMENTS

| | | |
|---|---|---|
| 6,962,382 B2 | 11/2005 | Scarlett |
| 7,287,813 B2 * | 10/2007 | Aliev .................. 297/219.1 |
| 7,789,445 B2 * | 9/2010 | Hoffman et al. .......... 296/24.31 |
| 2006/0103155 A1 | 5/2006 | Spater |
| 2008/0005967 A1 | 1/2008 | Johnson |

* cited by examiner

PET BARRIER AND COVER

CROSS-REFERENCE TO RELATED APPLICATION

This application is a continuation-in-part of U.S. patent application Ser. No. 12/102,679, filed on Apr. 14, 2008, the disclosure of which is hereby expressly incorporated by reference herein.

BACKGROUND

Pets moving around freely in a vehicle are a safety hazard to themselves and to the passengers in the vehicle. For instance, if the pet is in the back seat of a vehicle, and the driver of the vehicle "slams on" the brakes, the pet could launch forward into the front seats and cause injury to the pet and/or to the driver. Moreover, if the pet climbs freely into the front seats of the vehicle, the pet will likely distract the driver and possibly cause an accident.

It is well known to install a pet barrier within a vehicle to separate two areas in a vehicle, such as a front row of seats and a back row of seats, or a back row of seats and a cargo area. In this manner, the animal can be transported in the vehicle without allowing the animal to climb freely between the two areas.

Many pet barriers are installed in a vehicle interior such that they extend from the floor to the ceiling of the vehicle to partition the animal transport area from the remainder of the vehicle. These pet barriers typically include spring-loaded elements that engage the floor and ceiling of the vehicle interior to secure the pet barrier therebetween. Thus, to properly secure the pet barrier between the floor and the ceiling, the pet barrier must be positioned substantially perpendicular between the floor and the ceiling. Moreover, the pet barrier is not moveable unless the spring-loaded elements are disengaged with the ceiling and floor and moved to another position.

Having a fixed pet barrier can cause problems when the driver or passenger needs to tilt or recline the seat or move the seat forward or backward. Thus, it is desired to have a pet barrier that suitably partitions a portion of a vehicle interior without interfering with the movement of the vehicle seats.

A further problem occurs when using a pet barrier made from tubing or other material that defines openings in the barrier. The pet can protrude his paws, head, etc., through the openings, which can cause disturbance to the driver of the vehicle and can cause harm to the pet. Thus, it is further desired to have an optional cover assembly for use with pet barriers having openings therein.

SUMMARY

A barrier for partitioning seats in a vehicle includes a barrier portion and at least one attachment member adapted to secure the barrier portion to a vehicle seat. The barrier portion includes an upper center portion mateable with a lower center portion. The barrier portion further includes a first cross bar secured to the upper center portion, with the first cross bar having first and second ends, a second cross bar secured to the lower center portion, with the second cross bar having first and second ends, and a first connection member securable to the first ends of the first and second cross bars.

A cover for use with a pet barrier having a frame with first and second ends includes a body portion sized and shaped to cover at least a portion of the frame and first and second attachment members defined on the body portion. The first attachment member is sized and configured to be releasably secured to one of the first and second ends of the frame, and the second attachment member is sized and configured to be releasably secured to the other of the first and second ends of the frame. The cover further includes a closure assembly configured to selectively secure the second attachment member to the frame.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
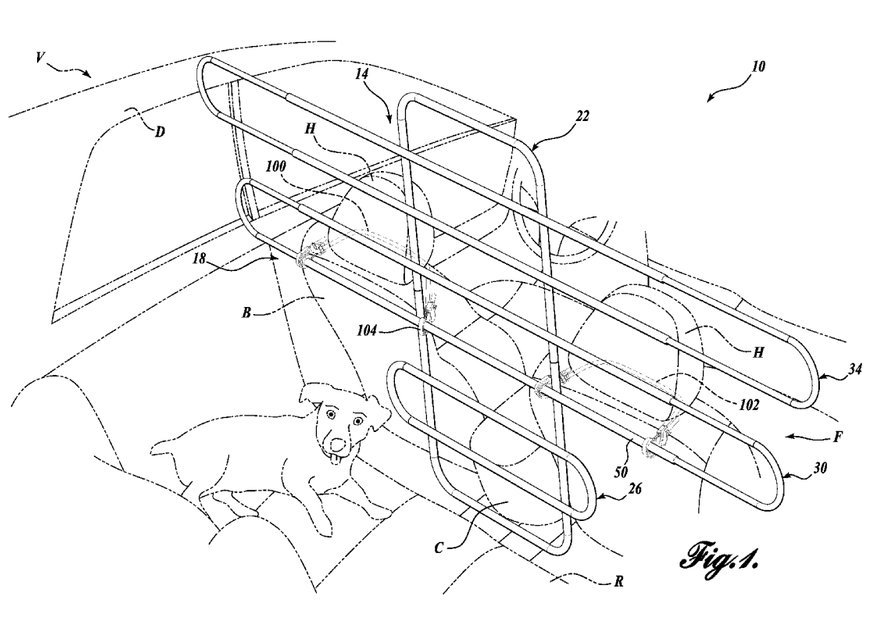
FIG. 1 is an environmental view of a representative embodiment of the moveable pet barrier, wherein the pet barrier is secured to a row of seats within an interior of a vehicle.

A moveable pet barrier 10 constructed in accordance with one embodiment of the present disclosure is best seen by referring to FIG. 1. The pet barrier 10 is used to partition first and second areas of a vehicle V such that an animal positioned in one of the areas can travel within the vehicle without being able to move freely between the first and second areas of the vehicle. The pet barrier may be used in any suitable vehicle V having a row of seats and an area behind the row of seats, such as a second row of seats or a cargo space. The vehicle depicted in FIG. 1 is an example of a suitable vehicle that can be partitioned by the pet barrier 10, and it includes front seats F and rear seats R positioned behind the front row of seats F. Each of the front seats F includes a seatback B and a headrest H secured to an upper portion of the seatback B. It should be appreciated that the pet barrier 10 may instead be used to partition any other suitable vehicle or area.

The pet barrier 10 includes a barrier portion 14 that is configured to separate the first and second areas of a vehicle, such as the front seats F and the rear seats R. The pet barrier 10 further includes an attachment assembly 18 for securing the barrier portion 14 to a portion of the vehicle, such as the seatback B or the headrest H.

Figure 2:
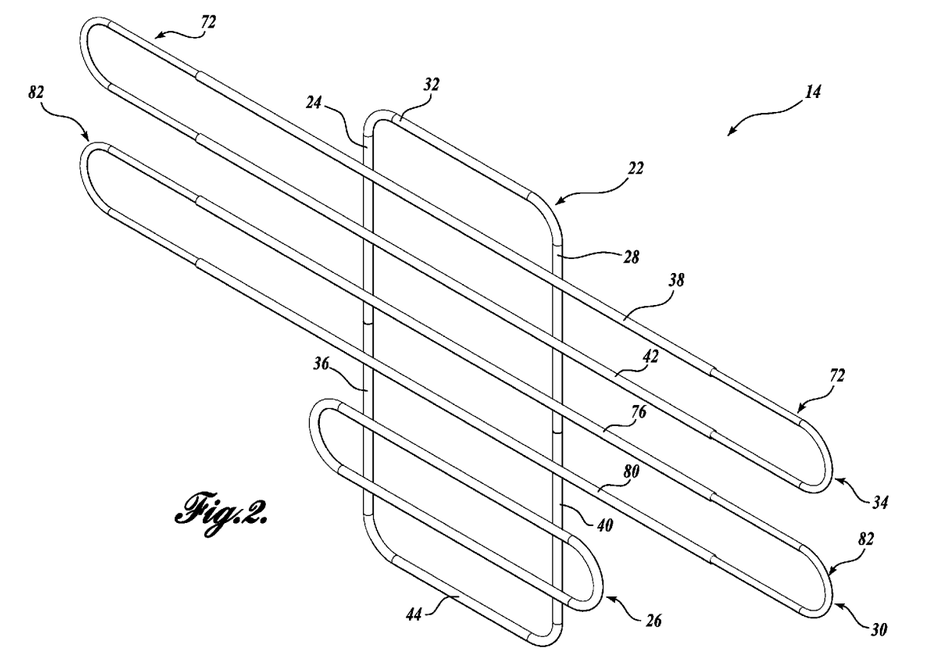
FIG. 2 is an isometric view of the barrier portion of the moveable pet barrier of FIG. 1.
Figure 3:
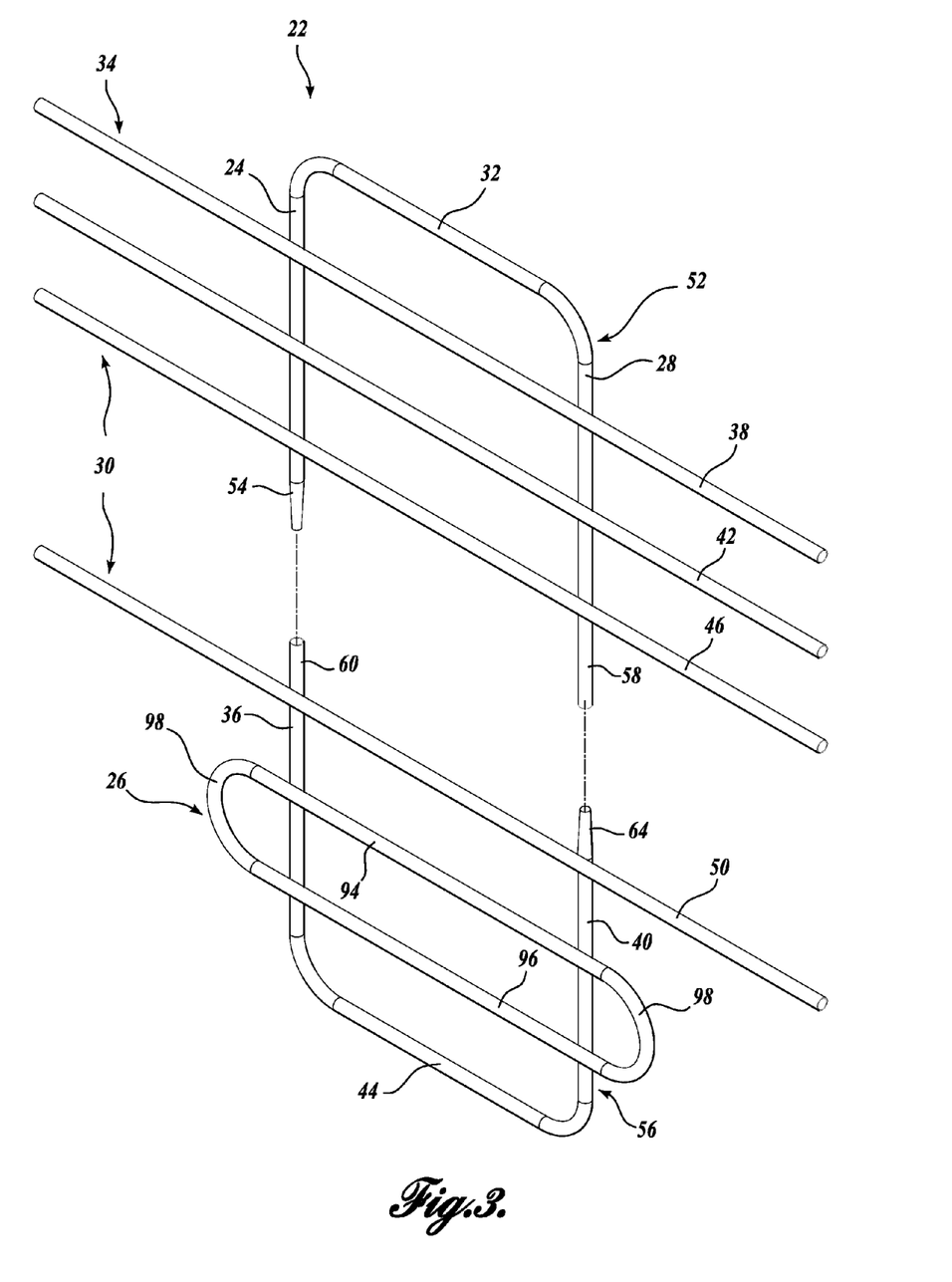
FIG. 3 is a partial exploded view of the barrier portion of FIG. 2.

Referring additionally to FIGS. 2 and 3, the barrier portion 14 of the pet barrier 10 will now be described in detail. The barrier portion 14 is formed from several sections of tubing, such as steel, aluminum, or another type of metal tubing, or any other type of material that is durable and lightweight, such as a high quality plastic material. The barrier portion 14 includes a center upright section 22 that is defined by an upper center portion 52 and a lower center portion 56 that are securable together to form a substantially rectangular configuration.

The upper center portion 52 includes first and second substantially parallel upper side members 24 and 28 and a substantially transverse upper member 32 extending between and connecting the upper ends of the first and second upper side members 24 and 28. The corners defined by the intersection of the first and second upper vertical members 24 and 28 and the upper transverse member 32 may be curved to provide a more contoured design. The lower center portion 56 substantially mirrors the upper center portion 52 and is defined by parallel first and second lower side members 36 and 40 and a lower transverse member 44 extending therebetween.

To secure the upper and lower center portions 52 and 56 together, the first and second ends 54 and 58 of the first and second upper side members 24 and 28 of the upper center portion 52 are positioned to engage the first and second ends 60 and 64 of the first and second lower side members 36 and 40 of the lower center portion 56. Although the upper center portion 52 may be secured to the lower center portion 56 in any suitable manner, the first and second ends 54 and 58 of the upper center portion 52 are preferably frictionally engaged with the first and second ends 60 and 64 of the lower center portion 56.

To accomplish a friction fit, the first end 54 of the upper center portion 52 is preferably swaged, and the second end 64 of the lower center portion 56 is swaged. The first and second swaged ends 54 and 64 are of a diameter such that they are adapted to be frictionally received within first and second ends 60 and 58, respectively. In this manner, the upper center portion 52 is not easily separated from the lower center portion 56. It should be appreciated that the first and second ends 60 and 58 may instead be swaged and adapted to be received within the first and second ends 54 and 64, respectively. The first and second ends 54 and 60 and 58 and 64 may further include a pushbutton assembly (not shown) or other mechanism defined between the ends to additionally secure the upper center portion 52 to the lower center portion 56.

Moreover, with the upper and lower center portions 52 and 56 each including a swaged end 54 and 64 that is receivable only within one opposing end (60 and 58, respectively) of the other of the upper or lower center portion 52 or 56, the upper and lower center portions 52 and 56 must be arranged in a specific manner when the barrier portion 14 is assembled. For instance, the upper and lower center portions 52 and 56 must be assembled to both face the same direction (e.g. with the upper, middle, and lower cross sections 34, 30, and 26 mounted on the same side of the center vertical section 22). However, it should be appreciated that the upper center portion 52 may instead include first and second ends 54 and 58 that are adapted to be engaged with either of the first and second ends 60 and 64 of the lower center portion 56. In this manner, the upper and lower center portions 52 and 56 may be arranged any suitable manner when the barrier portion 14 is assembled.

Referring to FIGS. 2 and 3, the barrier portion 14 further includes an upper cross section 34, a middle cross section 30, and a lower cross section 26 secured to the center upright section 22 in any suitable manner, such as by welding. The upper cross section 34 is defined by a first upper crossbar 38 mounted to the first and second upper side members 24 and 28 of the upper center portion 52. The first upper crossbar 38 is mounted to the first and second upper side members 24 and 28 such that it is substantially transverse to the longitudinal axes of the first and second side members 24 and 28. The upper cross section 34 further includes a first lower crossbar 42 secured to the first and second upper side members 24 and 28 in a spaced parallel relationship to the first upper crossbar 38.

Figure 4:
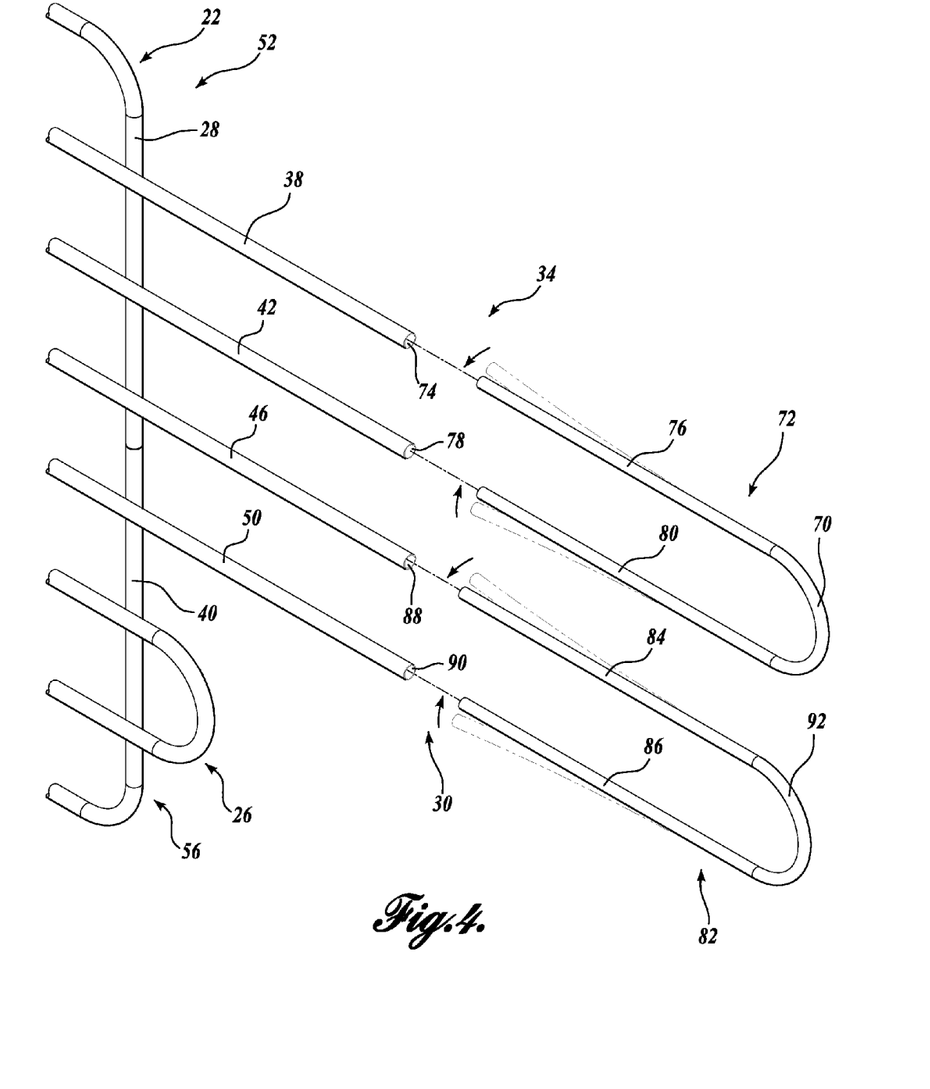
FIG. 4 is a partial exploded view of the barrier portion of FIG. 2, wherein a plurality of cross bars are being bent to receive U-shaped members thereon.

Referring also to FIG. 4, portions of the first upper and lower crossbars 38 and 42 extend laterally from the first and second upper side members 24 and 28 and include end openings for receiving the ends of a first connection member, or slide element 72 therein. The first slide element 72 is preferably substantially U-shaped and is defined by a first upper slide bar 76, a first lower slide bar 80, and a first U-shaped end portion 70 extending therebetween to position the first upper and lower slide bars 76 and 80 in a spaced parallel relationship. The first upper slide bar 76 is receivable within the end opening 74 of the first upper crossbar 38 and the first lower slide bar 80 is receivable within the end opening 78 of the first lower crossbar 42.

The first upper and lower slide bars 76 and 80 are slidably and frictionally received within the end openings 74 and 78 to prevent the first slide element 72 from being easily removed when the pet barrier 10 is assembled. To achieve a friction fit, the first upper and lower slide bars 76 and 80 may be bent slightly outwardly from each other when they are formed such that when a user is assembling the pet barrier 10, the first upper and lower slide bars 76 and 80 must be bent towards each other to be received within the end openings 74 and 78 of the first upper and lower crossbars 38 and 42. In the alternative, the first upper and lower crossbars 38 and 42 may instead be formed with a slight bend such that they must be bent towards each other to frictionally receive the first upper and lower slide bars 76 and 80.

With the first upper and lower slide bars 76 and 80 being urged in opposite directions, the first upper and lower slide bars 76 and 80 are frictionally received within the first upper and lower crossbars 38 and 42 such that the slide element 72 is maintained within the first upper and lower crossbars 38 and 42. However, the friction fit is not so tight such the first upper and lower slide bars 76 and 80 may not slide within the first upper and lower crossbars 38 and 42. As such, the slide element 72 may be moved within the first upper and lower crossbars 38 and 42 to adjust the width of the upper cross section 34. Moreover, a slide element 72 may be received within each end of the first upper and lower crossbars 38 and 42 to adjust the width of the upper horizontal section 34 in two directions. It should be appreciated that the pet barrier 10 may include any other suitable design for adjusting the width of the upper horizontal section 34 or another portion of the pet barrier 10.

Referring again to FIGS. 2 and 3, the middle cross section 30 is constructed substantially identical to the upper horizontal portion 34. The middle horizontal portion 30 includes a second upper crossbar 46 secured to the first and second upper side members 24 and 28 of the upper center portion 52. The second upper crossbar 46 is mounted to the first and second upper side members 24 and 28 such that it is substantially transverse to the longitudinal axes of the first and second upper side members 24 and 28 and in a spaced parallel relationship to the first upper and lower slide bars 76 and 80. A second lower crossbar 50 is secured to the first and second lower side members 36 and 40 such that it is substantially transverse to the longitudinal axes of the first and second lower side members 36 and 40. In this manner, the second lower crossbar 50 is positioned substantially parallel to the second upper crossbar 46 when the upper center portion 52 is mated with the lower center portion 56 as described above.

When the upper and lower center portions 52 and 56 are assembled together, the ends of the second upper and lower crossbars 46 and 50 are adapted to slidably receive a second substantially U-shaped slide element 82 therein. The second U-shaped slide element 82 is similar to the first U-shaped slide element 72 in that it has a second upper slide bar 84, a second lower slide bar 86, and a U-shaped end portion 92 extending therebetween to position the upper and lower slide bars 84 and 86 in a spaced parallel relationship. The second U-shaped slide element 82 is slidably and frictionally received within end openings 88 and 90 of the second upper and lower crossbars 46 and 50 in a substantially similar manner that the first slide element 72 is received within end openings 74 and 78 of the first upper and lower crossbars 38 and 42. Therefore, the manner in which the second slide element 82 is slidably and frictionally received within the second upper and lower crossbars 46 and 50 will not be hereinafter described in detail.

The second U-shaped slide element 82 secures the second upper slide bar 84 to the second lower slide bar 86 to define the middle cross section 30. As discussed above, the middle cross section 30 is secured to the center upright section 22, and the center upright section 22 is defined by an upper center section 52 mated to a lower center section 56. The second upper crossbar 46 of the middle cross section 30 is secured to the upper center section 52, and the second lower crossbar 50 of the middle cross section 30 is secured to the lower center section 56. Accordingly, the second U-shaped slide element 82 helps secure the lower center section 56 to the upper center section 52.

Referring to FIG. 3, the lower cross section portion 26 is substantially similar to the upper and middle cross sections 34 and 30 except that the lower cross section 26 is preferably formed as an integral structure. The lower cross section 26 is defined by third upper and lower crossbars 94 and 96 and curved end portions 98. The third upper and lower crossbars 94 and 96 are secured to the first and second lower vertical members 36 and 40 in a spaced parallel relationship to each other and substantially transverse to the longitudinal axes of the first and second lower vertical members 36 and 40. It should be appreciated that the lower horizontal section may instead include slide elements receivable within the ends of the third upper and lower crossbars 94 and 96 similar to the middle and upper cross sections 30 and 34.

The upper, middle, and lower cross sections 34, 30, and 26 are arranged on the center upright section 22 to suitably partition first and second areas of a vehicle. It should be appreciated that the upper, middle, and lower cross sections 34, 30, and 26, may be any suitable shape and may be arranged on the center upright section 22 in any suitable manner to adequately partition the first and second areas of the vehicle.

Referring back to FIG. 1, the barrier portion 14 is secured within the vehicle to separate the front seats F from the rear seats R. The barrier portion 14 is positioned against the backs B of the front seats F in any suitable, desired position. Preferably, the barrier portion 14 is positioned against the backs B of the front seats F such that the center vertical section 22 is substantially centered width-wise within the vehicle interior. The vertical position of the barrier portion 14 is adjusted to suitably partition the front and rear seats F and R. The lower cross section 26 is preferably positioned against a bottom portion of the seat backs B, and/or a center console C disposed between the front seats F, and the middle cross section 30 is positioned against an upper portion of the seat backs B and/or the seat headrests H. The upper cross section 34 may be positioned against a portion of the headrests H or may instead be disposed between the headrests H and the ceiling of the vehicle. If the pet barrier 10 is being used within a larger vehicle, such as a van, truck, recreational vehicle, etc., an additional section (see FIG. 9) similar in shape and design to the center upright section 22 and having a cross section secured thereto that is similar in shape and design to the lower cross section 26 may be secured to the barrier portion 14 to increase the overall height of the barrier portion 14. Any suitable section may be used, and it may be secured to the barrier portion in any suitable manner. For instance, the barrier portion 14 may include tapped holes drilled within the lower center section 56 that are adapted to receive fasteners, such as screws, to couple the additional section to the barrier portion 14.

The width of the barrier portion 14 may also be adjusted to ensure adequate separation of the front and rear seats F and R. The width of the barrier portion 14 is adjusted through the use of the first and second sliding elements 72 and 84 as described above. The width can be adjusted until the barrier portion 14 extends across a majority or substantially all of the vehicle interior to adequately partition the front and rear seats F and R.

With the barrier portion 14 positioned within the vehicle as described above, the barrier portion 14 extends across substantially all open areas defined between the front and rear seats F and R. More specifically, the lower, middle, and upper cross sections 26, 30 and 34 extend across at least a portion of any gap defined between the front seats F. The middle and upper cross sections 30 and 34 extend across at least a portion of any gap defined between the front seats F and the interior of the vehicle doors D (only one door shown for clarity). Moreover, the upper cross section 34, and possibly a portion of the middle cross section 30, is positioned between the headrests H and the ceiling of the vehicle. As such, the barrier portion 14 substantially separates the front seats F from the rear seats R.

The barrier portion 14 is secured to the front seats F through the attachment assembly 18. The attachment assembly 18 may be any suitable assembly that is adapted to secure the barrier portion 14 to the seat backs B or the head rests H of the front seats F. A preferred attachment assembly 18 includes first and second cords 100 and 102 that are preferably made at least in part from an elastic material that is stretchable like a bungee cord. Any suitable rope or cable, stretchable or non-stretchable, may instead be used. A hook 104 is secured to each end of the cords 100 and 102 for securing the cord ends to a section of tubing on the barrier portion 14. The hooks 104 are preferably adjustably secured to the ends of each cord 100 and 102 such that the cords 100 and 102 may be adjusted in length to accommodate various attachment locations on the front seats F. It should be appreciated that only one hook may instead be used, with the open end of the cord being tied or otherwise attached to the barrier portion 14 or the front seats F.

To secure the barrier portion 14 to the front seats F, the first cord 100 is passed around a portion of one of the front seats F, such as a backrest B or a headrest H, and the hooks 104 on each end of the first cord 100 are secured to the barrier portion 14. Depending on whether the first cord 100 is passed around the seatback B or the head rest H, the first cord 100 may first be adjusted in length such that the first cord 100 fits snugly around the seatback B or the head rest H. FIG. 1 depicts the first cord 100 passing around one of the headrests H with each hook 104 secured to the second lower cross bar 50 of the middle horizontal section 30. It should be appreciated that the hooks 104 may instead be secured on any other section of the barrier portion 14. The second strap 102 is used to secure a second section of the barrier portion 14 to the other headrest H in the same manner.

Figure 5:
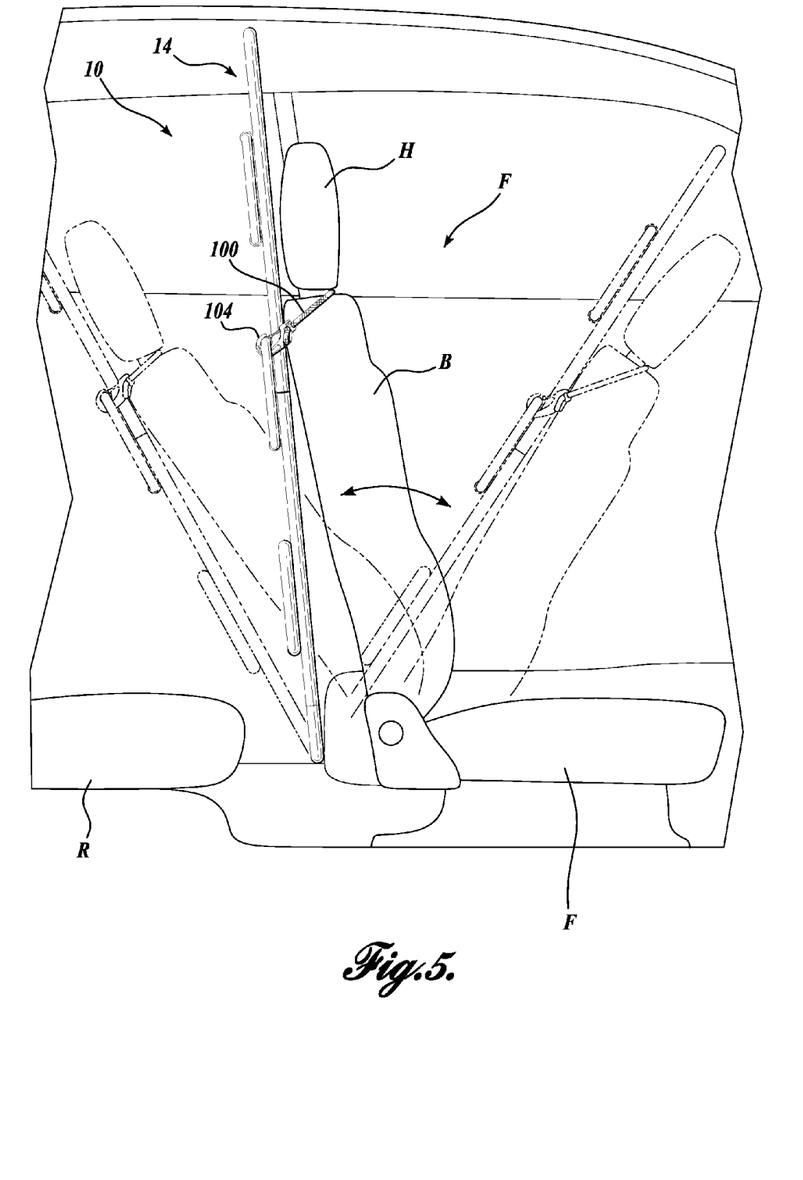
FIG. 5 is a side view of the pet barrier of FIG. 1, wherein at least a portion of the row of seats is being moved between first and second positions.
Figure 6:
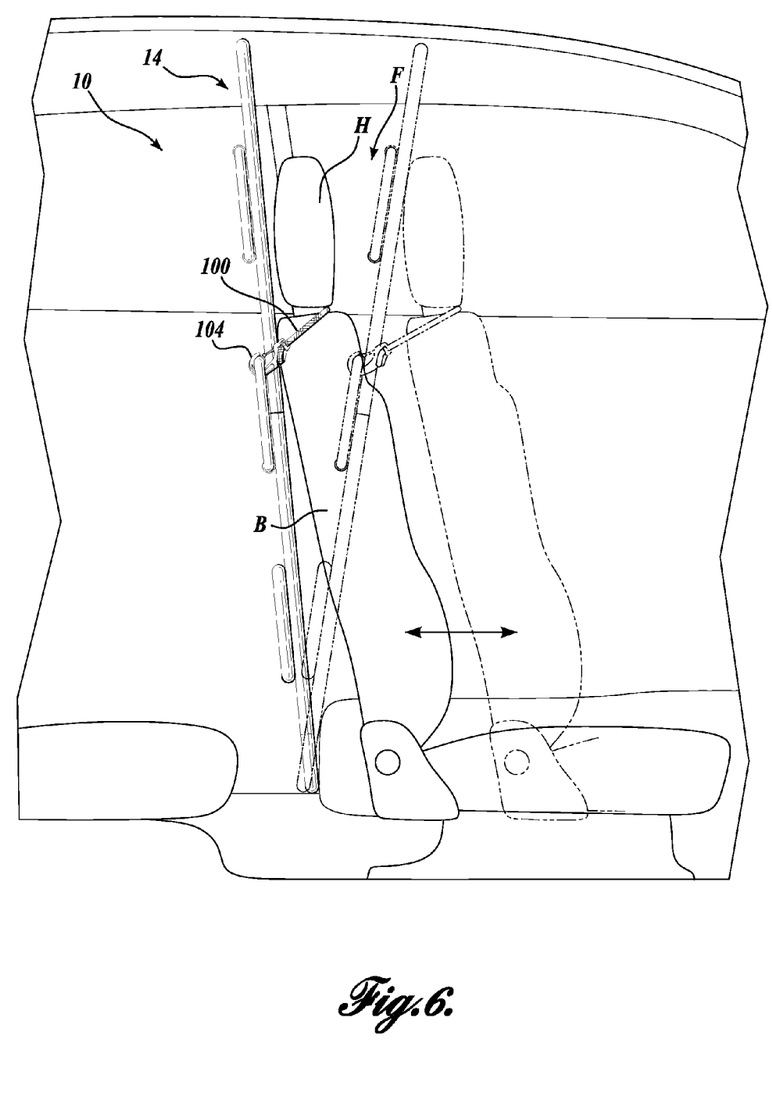
FIG. 6 is a side view of the pet barrier of FIG. 1, wherein at least a portion of the row of seats is being moved between third and fourth positions.

Referring to FIGS. 1, 5, and 6, with the barrier portion 14 positioned against the seat backs B in the manner described above, and with the cords 100 attaching the second lower cross bar 50 of the barrier portion 14 to the headrests H, the barrier portion 14 can pivot about the horizontal axis defined by the second lower cross bar 50. Moreover, with the first upper cross section 34 and a majority of the middle cross section 30 positioned above the pivot axis (the second lower cross bar 50), the majority of the weight of the barrier portion 14 is above the pivot axis. As such, the barrier portion 14 pivots away form the headrests H and towards the seat backs B and console C when the seat backs B are slightly tilted toward the rear seats R. In this manner, the barrier portion 14 is held firmly against the seat backs B. It should be appreciated that the barrier portion 14 may instead be "top heavy" by adding weight to the upper barrier portion 14 and thereafter positioning the barrier portion 14 against the seat backs B in any other suitable manner.

Referring to FIGS. 5 and 6, the barrier portion 14 is secured to the headrests H or the seatbacks B in a manner that allows either one of the front seats F to move substantially uninhibited by the barrier portion 14. As shown in FIG. 5, the seatbacks B can recline and rotate forward while the barrier portion 14 is positioned against the seatback B and secured to the headrest H. If the first cord 100 is elastic, the first cord 100 can stretch to allow the barrier portion 14 to adjust in position against the front seats F when the seatback B is moved. Similarly, either one of the front seats F can tilt or slide forward and rearward while having the barrier portion 14 secured thereto, as shown in FIGS. 5 and 6. As such, the pet barrier 10 does not need to be moved or removed from its position when the driver or passenger wishes to move the front seats F.

While illustrative embodiments have been illustrated and described, it will be appreciated that various changes can be made therein without departing from the spirit and scope of the present disclosure. For instance, the pet barrier 10 may instead be used to partition any other suitable area of a car or an area of a building, such as a stairway. The straps 100 and 102 can be passed around any suitable support structure to position the barrier portion 14 in a desired location. Moreover, the pet barrier 10 may instead be used to isolate an area from children. Also, a larger or fewer number of cross sections similar to cross sections 26, 30, and 34 can be utilized depending on various factors, such as the size of the vehicle and/or size of the pet(s) or other things or items sought to be isolated. Thus, it should be appreciated that the foregoing description of the pet barrier 10 should not be seen as limiting the claimed subject matter.

Referring to FIGS. 7-10, a cover 200 for use with the pet barrier 10 or any other suitable pet barrier having a barrier portion or frame will be hereinafter described. The cover 200 is suitable for closing off certain open areas of the pet barrier 10 such that the pet isolated in the predetermined area, such as in the rear seats R (see FIG. 1), cannot access the area on the opposite side of the barrier 10, such as the front seats F. More specifically, by using the cover 200, the pet cannot stick his head, paws, etc., through the portion of the barrier 10 covered by the cover 200.

Figure 7:
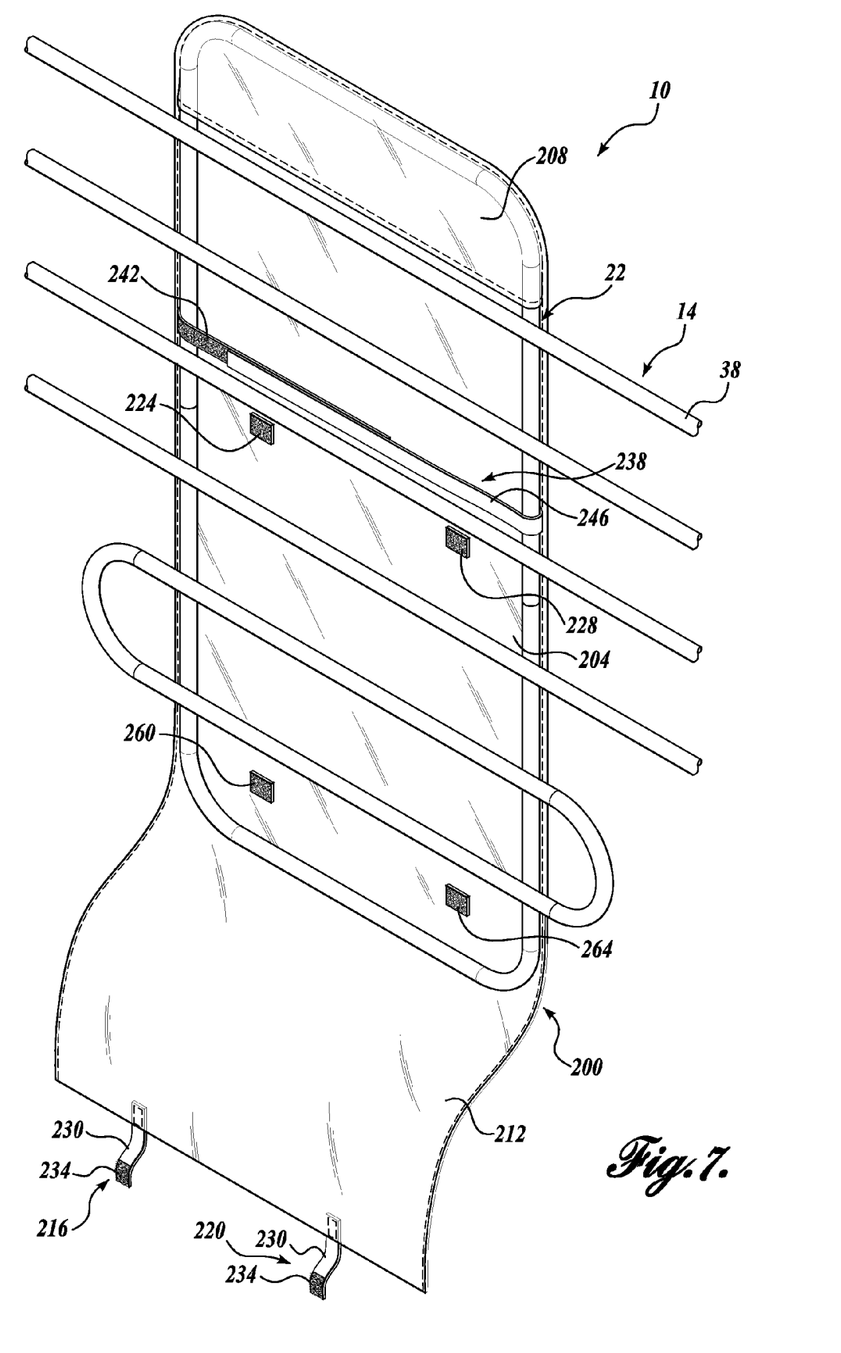
FIG. 7 is an isometric view of a cover for use with the pet barrier of FIG. 1, wherein the cover is shown in a first position.

Referring to FIG. 7, a first embodiment of the cover 200 will be hereinafter described in detail. The cover 200 includes a body portion 204 that is substantially the same size and shape as the center upright section 22 of the barrier portion 14. The body portion 204, as well as the remaining portions of the cover 200, may be made from any suitably durable, transparent, translucent, or substantially or partially see-through material, such as plastic or vinyl, fabric, mesh, hardware cloth of various material compositions, such as a plastic composition or metallic, etc. In the embodiment depicted, the cover 200 is made from a suitably durable, flexible plastic material that is substantially transparent to enable visibility for the pet and the pet owners.

A first attachment member, or an upper pocket or open hem 208 is formed within an upper end of the body portion 204. The upper pocket 208 is sized and shaped to receive a portion of the center upright section 22 above the first upper crossbar 38. In that regard, the upper pocket 208 is substantially the same shape as the center upright section 22 above the first upper crossbar 38 and slightly larger in size such that the center upright section 22 may be disposed within the upper pocket 208. The upper pocket 208 may be formed in any suitable manner, such as by folding over a piece of the body portion 204 and securing the folded-over edges together. The folded-over edges may be secured together in any suitable manner, such as by sewing, with an adhesive, with slide fasteners, etc. As can be seen in FIG. 7, the corners of the upper pocket 208 are rounded to correspond to the shape of the center upright section 22 of the pet barrier 10. It should be appreciated that the upper pocket 208 may instead be formed independently and thereafter secured to the body portion 204.

Figure 8:
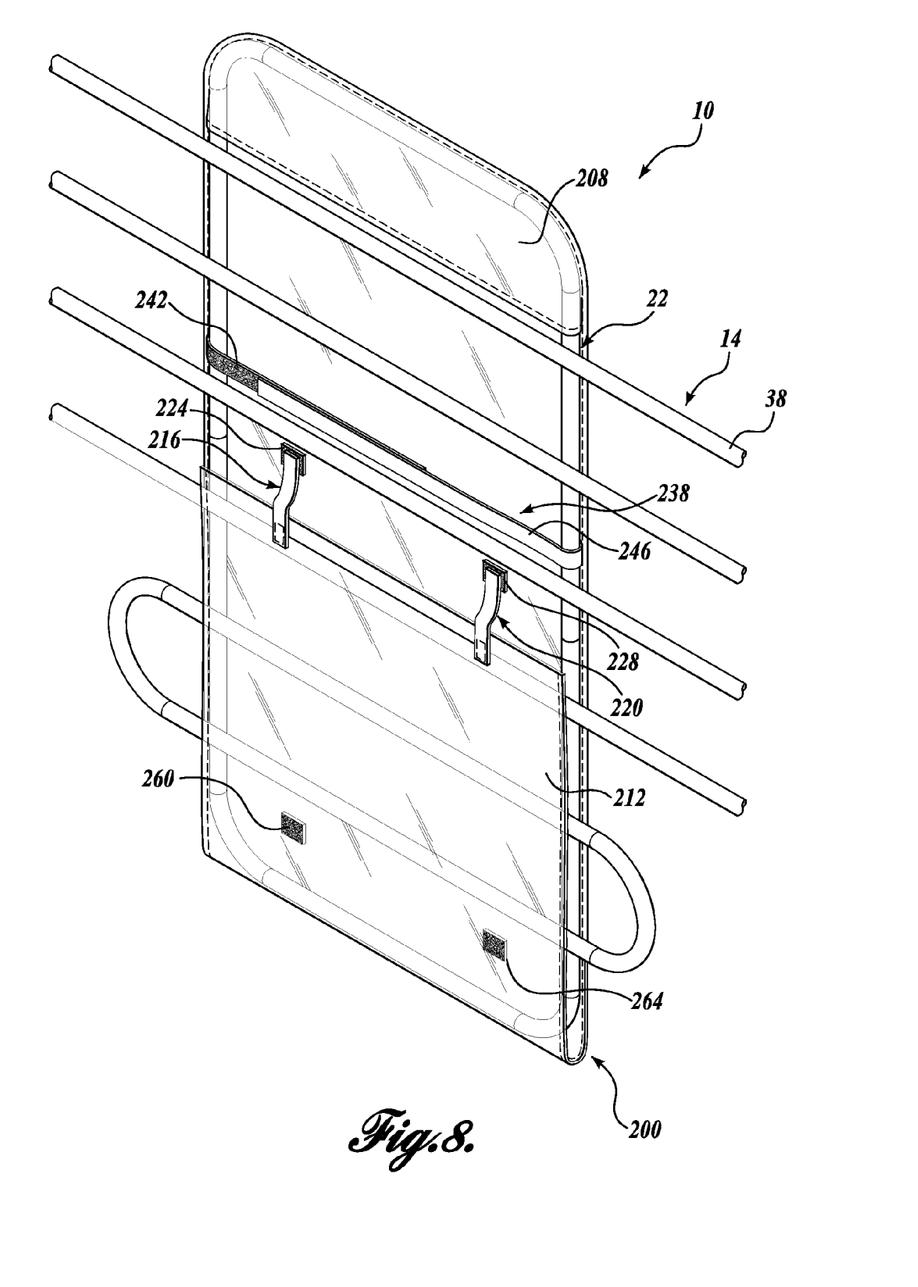
FIG. 8 is an isometric view of a cover for use with the pet barrier of FIG. 1, wherein the cover is shown in a second position.

Referring to FIGS. 7 and 8, with the center upright section 22 disposed within the upper pocket 208, a second attachment member, or flap 212 extends downwardly from the body portion 204 below the bottom edge of the center upright section 22. The flap 212 may be a continuous extension of the body portion 204 or an independent piece that is secured to the body portion 204 in a suitable manner, such as by sewing, with an adhesive, with a slide fastener, with snaps, with hook and loop fasteners, etc. The flap 212 extends downwardly from the lower edge of the center upright section 22 a suitable amount such that the flap 212 may be folded upwardly over the bottom edge of the center upright section 22 when the upper end of the center upright section 22 is disposed within the upper pocket 208. The flap 212 is of a suitable length to enclose at least a portion of the center upright section 22 between the flap 212 and the body portion 204 in the folded-over position.

To secure the flap 212 in its folded-over position, as shown in FIG. 8, a closure assembly having first and second closure mechanisms 216 and 220 secured to the bottom end of the flap 212 are releasably securable to third and fourth closure mechanisms 224 and 228 secured to the interior surface of the body portion 204. The closure mechanisms may be any suitable design that allows the flap 212 to be secured to the body portion 204 when in use and unattached from the body portion 204 for readjustment or removal of the cover 200 from the pet barrier 10.

In the depicted embodiment, the closure mechanisms 216, 220, 224, and 228 are defined by hook and loop type fasteners, such as Velcro® fasteners. More specifically, the first and second closure mechanisms 216 and 220 each include a strap portion 230 secured to the flap 212 and extending downwardly from its lower edge, and a hook-type fastener portion 234 secured to the interior surface of the strap portion 230. The third and fourth closure mechanisms 224 and 228 are defined by loop-type fasteners secured to the interior surface of the body portion 204 with adhesive or by other suitable means. The hook-type fastener portion 234 of the first and second closure mechanisms 216 and 220 are releasably attachable to the loop-type fasteners of the third and fourth closure mechanisms 224 and 228.

It should be appreciated that the closure mechanisms 216, 220, 224, and 228 may instead include any other suitable structure for releasably securing the first and second closure mechanisms 216 and 220 to the third and fourth closure mechanisms 224 and 228, such as buttons, snaps, reusable adhesive, hooks, etc. Moreover, it should be appreciated that the first and second closure mechanism 216 and 220 may instead wrap around a portion of the barrier portion 14 (and secured onto themselves, tied to the barrier portion, etc.) rather that securing the first and second closure mechanism 216 and 220 to the third and fourth closure mechanisms 224 and 22 on the body portion 204. Thus, the foregoing description and illustrations herein should not be seen as limiting the scope of the claimed subject matter.

The third and fourth closure mechanisms 224 and 228 are positioned on the body portion 204 to engage the hook-type fastener portion 234 of the first and second closure mechanisms 216 and 220 when the flap 212 is folded upwardly over the bottom edge of the center upright section 22. In this manner, the cover 200 is securely fastenable to the center upright section 22 of the pet barrier 10.

Figure 9:
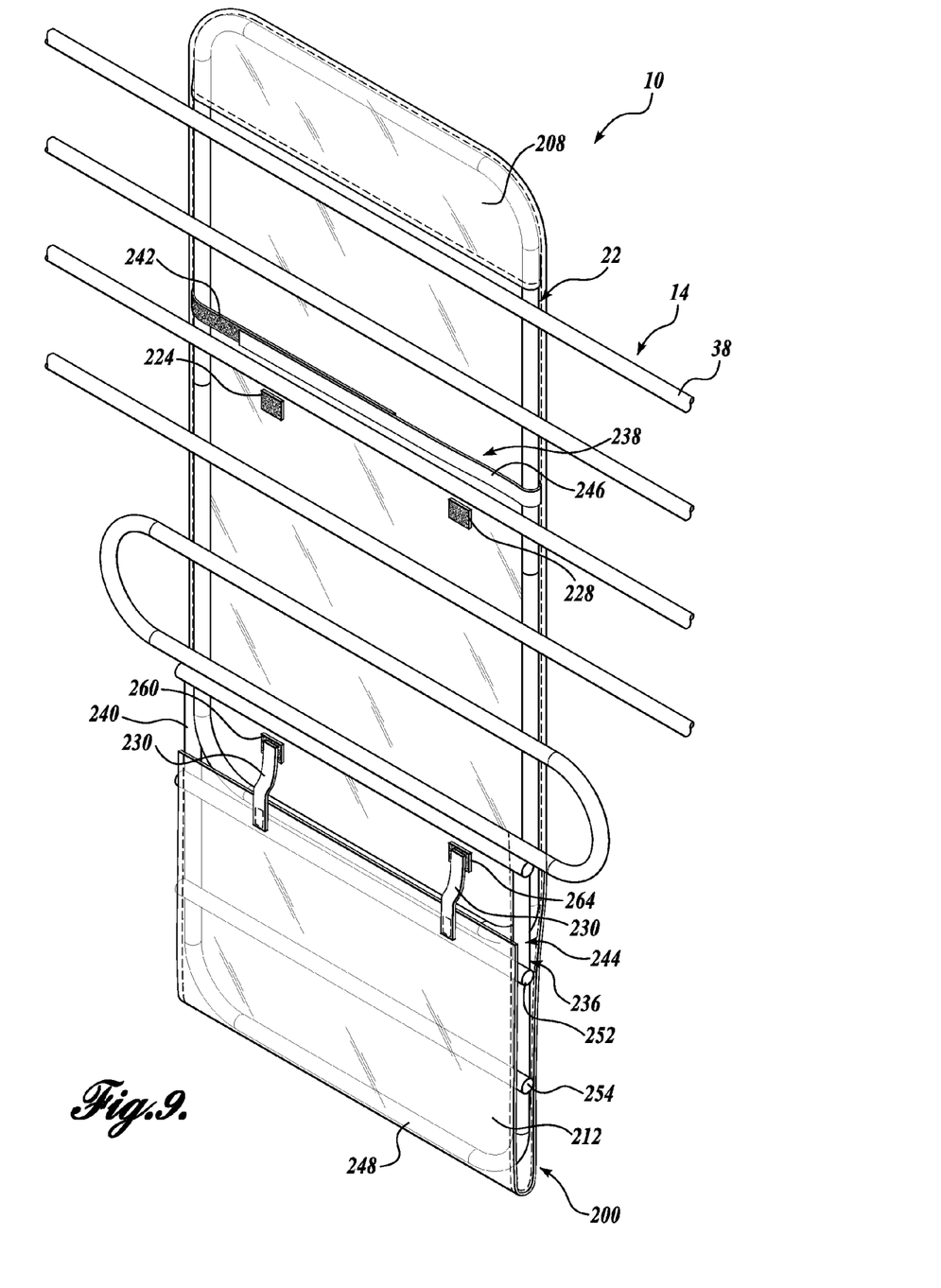
FIG. 9 is an isometric view of a cover for use with the pet barrier of FIG. 1 having an extension piece, wherein the cover is shown in a second position.

As noted above, if the pet barrier 10 is being used within a larger vehicle, such as a van, truck, recreational vehicle, etc., an additional section may be used to increase the overall height of the barrier portion 14. Referring to FIG. 9, an exemplary embodiment of an extension piece 236 configured to be secured to the center upright section 22 to increase the overall height of the center upright section 22 is shown. The extension piece 236 is similar in shape and design to a bottom portion of the center upright section 22. More specifically, the extension piece 236 includes first and second side members 240 and 244 and a transverse member 248 extending between the lower ends of the first and second side members 240 and 244. The extension piece 236 may include first and second cross members 252 and 254 extending across the first and second side members 240 and 244 to help increase the stability of the extension piece as well as to help partition the first and second desired areas of the vehicle. U-shaped members (not shown) may or may not be received within or secured to the ends of the first and second cross members 252 and 254, similar to the lower cross-section 26.

The extension piece 236 may be secured to the center upright section 22 by any suitable means. For instance, the barrier portion 14 may include tapped holes drilled within the lower center section 56 that are adapted to receive fasteners, such as screws, to couple the extension piece 236 to the center upright section 22 of the barrier portion 14. In the alternative, the extension piece 236 may be secured to the lower center section 56 through ties, straps, hook and loop fasteners, etc. As yet another alternative, the extension piece 236 may be adjustably secured to the lower center section 56 through a slide rail mechanism, a ball detent mechanism, etc. In this alternative embodiment, the extension piece 236 may be moved between one of several positions or otherwise extended as much as needed to accommodate the height of the space to be partitioned. It should be appreciated that any suitable extension piece design may be used and the extension piece may be releasably and/or adjustably secured to the center upright section 22 in any suitable manner.

When the extension piece 236 is used, it may also be covered by the cover 200. In that regard, the cover 200 may include fifth and sixth closure mechanisms 260 and 264 secured to the interior surface of the body portion 204. The fifth and sixth closure mechanisms 260 and 264 are loop-type fasteners similar to the third and fourth closure mechanisms 224 and 228. The fifth and sixth closure mechanisms 260 and 264 are positioned lower on the body portion 204 to engage the hook-type fastener portion 234 of the first and second closure mechanisms 216 and 220 when the flap 212 is folded upwardly over the bottom edge of the extension piece 236. In this manner, the cover 200 is securely fastenable to the center upright section 22 and the extension piece 236 of the pet barrier 10.

It should be appreciated that the third, fourth, fifth and sixth closure mechanisms 224, 228, 260 and 264 may instead be defined as a continuous strip of loop-type fastener material that extends along at least a portion of the length of the body portion 204. In this manner, the flap 212 may be folded over and secured to the body portion 204 with any suitable extension piece. Moreover, if the extension piece is secured to the barrier portion with an adjustable fastening mechanism, such as a slide rail mechanism, a ball detent mechanism, etc., the position of the flap 212 against the body portion 204 may be adjusted as needed.

To help further secure the cover 200 to the pet barrier 10, the cover 200 may include one or more optional strap assemblies 238 configured to releasably secure the cover to the barrier portion 214. In the depicted embodiment, a single strap assembly 238 is depicted. The strap assembly 238 extends between opposite lateral edges of the body portion 204; however, it should be appreciated that the strap assembly 238 may extend between any opposing portions of the cover 200.

The strap assembly 238 includes a first strap 242 extending from a first lateral edge of the body portion 204 and a second strap 246 extending from a second, opposite lateral edge of the body portion 204. The first strap 242 is configured to engage and releasably attach to the second strap 246 through suitable means, such as through hook and loop type fasteners (such as Velcro® fasteners). For instance, the first strap 242 may be formed from a loop material, and the second strap 246 may be formed from a hook material. As such, the second strap 246 is releasably securable to the first strap 242 to help further secure the cover 200 on the barrier portion 214.

It should be appreciated that any other suitable means to help additionally secure the cover 200 on the barrier portion 14 may instead be used. For instance, an elastic strap, belt, tie, etc., may extend between opposing portions of the cover 200 to wrap around or otherwise releasably secure the cover 200 to the barrier portion 14.

Referring to FIGS. 7 and 8, the manner in which the cover 200 is secured to the barrier portion 14 will be hereinafter described. To position the cover 200 against the barrier portion 14, the center upright section 22 above the first upper crossbar 38 may first be disposed within the upper pocket 208. With the center upright section 22 received within the upper pocket 208, the body portion 204 of the cover 200 may be positioned against the center upright section 22 so that the flap 212 extends downwardly from the lower edge of the center upright section 22. The flap 212 may then be folded upwardly over the bottom edge of the center upright section 22 so that the first and second closure mechanisms 216 and 220 may be secured to the third and fourth closure mechanisms 224 and 228 (or the fifth and sixth closure mechanisms 260 and 264 if the extension piece 236 is used). The first and second straps 242 and 246, if provided, may then be secured to one another.

With the cover 200 positioned against the center upright section 22 of the barrier portion 14 in this manner, the pet cannot protrude through the openings in the pet barrier 10 when the pet barrier 10 is being used to partition first and second areas. However, with the cover 200 being made from a suitable transparent or translucent material, the pet and owner can see into the other area.

It should be appreciated that although the cover 200 has been described and illustrated as being configured to cover the center upright section 22 of the pet barrier 10, the cover 200 may instead be adapted for use with any section of the pet barrier 10. For instance, an additional cover (not shown) may be used instead of or in addition to the cover 200 to extend laterally across the upper and middle cross-sections 34 and 30. With the upper and middle cross sections 34 and 30 being extendable horizontally, the additional cover may include a flap that may be used in a similar manner to that described above with respect to the extension piece 236 to configure the additional cover for use with various horizontal configurations.

Figure 10:
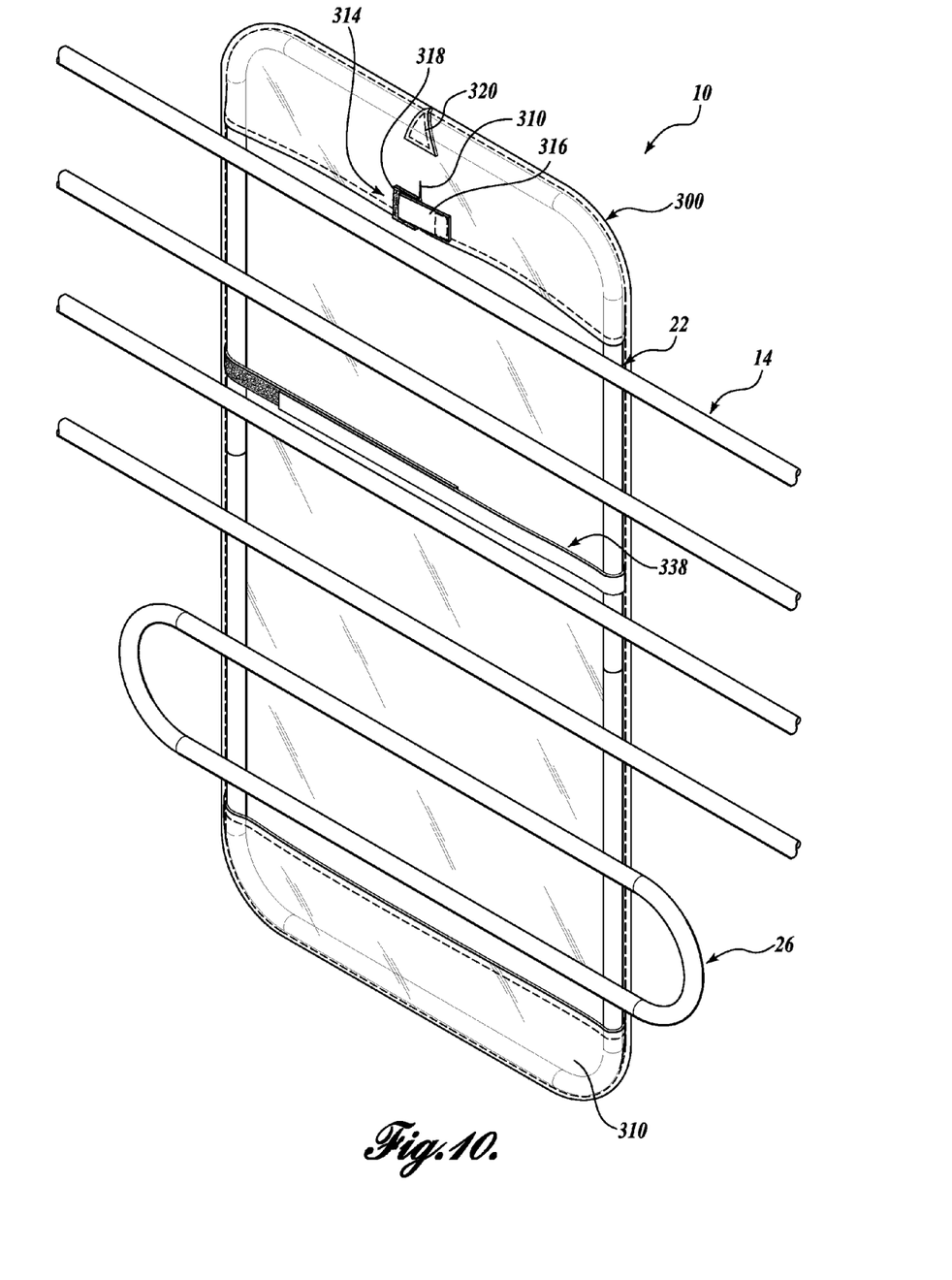
FIG. 10 is an isometric view of an alternate embodiment of a cover for use with the pet barrier of FIG. 1.

Referring to FIG. 10, an alternative embodiment of a cover 300 suitable for use with the pet barrier 10 will now be described. The cover 300 is similar to the cover 200 described above in that it includes a body portion 304 that is substantially the same size and shape as the center upright section 22 of the barrier portion 14. The body portion 304, as well as the remaining portions of the cover 300, may be made from any suitably durable, transparent, translucent, or substantially see-through material, such as plastic, mesh, etc.

A first attachment member, or an upper pocket 308 is formed within an upper end of the body portion 304. The upper pocket 308 is sized and shaped to receive a portion of the center upright section 22 above the first upper crossbar 38, similar to the upper pocket 208 described above. The cover 300, however, further includes a second attachment member in the form of a lower pocket 310 sized and shaped to receive a portion of the center upright section 22 below the lower cross section 26. The lower pocket 310 is similarly constructed to the upper pocket 308 (and upper pocket 208 described above), and therefore will not be hereinafter described in further detail.

It can be appreciated that with one end of the center upright section 22 received within an upper or lower pocket 308 or 310, it may be somewhat difficult to dispose the opposite end of the center upright section 22 within the other pocket, especially if the cover 300 is made from a non-elastic material. To help facilitate insertion of the barrier portion 14 into the upper and lower pockets 308 and 310, one of the upper and lower pockets 308 and 310 may include an opening formed within a portion of the pocket that is selectively closeable by a closure mechanism. The opening and closure mechanism may be any suitable design and configuration to enable the pocket opening to be selectively enlarged so that the center upright section 22 may be disposed within the pocket.

In the depicted embodiment, the opening is defined by a slit 310 formed near an edge of the upper pocket 308 that is selectively closeable by a closure mechanism 314 extending across the slit 310. More specifically, the slit 310 extends inwardly from an edge of the pocket 308, wherein the opening defined by the slit 310 may be widened when pulling the upper pocket 308 over the center upright section 22.

The closure mechanism 314 includes a strap 316 attached to the upper pocket 308 on a first side of the slit 310 that is securable to a fastening member 318 attached to the upper pocket 308 on the opposite side of the slit 310. In the depicted embodiment, the strap 316 includes a hook type fastener that is engageable with a loop type fastener on the fastening member 318. However, it should be appreciated that the closure mechanism 314 may instead include a strap that is securable across the slit 310 through a snap assembly, a button assembly, a zipper, etc.

A strengthening or reinforcing member 320 may be provided on the upper pocket 308 to help prevent the slit 310 from becoming larger, or to help prevent the upper pocket 308 from tearing at the top of the split 310. The strengthening member 320 may be any suitable device or structure, such as an extra piece of material secured to the upper pocket 308 in alignment with the slit 310, bar tacks (heavy stitching) sewn across the top of the slit 310, etc.

It should further be appreciated that the upper and/or lower pockets 308 and 310 (as well as the rest of the cover 300) may instead be made from a suitably elastic material such that the pockets may be simply stretched over the center upright section 22. Thus, it should be appreciated that the foregoing description should not be seen as limiting the scope of the claimed subject matter.

While illustrative embodiments of the cover have been illustrated and described, it will be appreciated that various changes can be made therein without departing from the spirit and scope of the present disclosure. In that regard, although the covers 200 and 300 have been described and illustrated as being designed for use with the pet barrier 10, it should be appreciated that the covers 200 and 300 may instead be adapted for use with any other suitable barrier having openings through which a pet could protrude.

The embodiments of the present disclosure in which an exclusive property or privilege is claimed are defined as follows:

1. A cover for use with a pet barrier for partitioning sections of a vehicle having spaced-apart, side-by-side seats, the pet barrier including a frame composed of an upright center section extending between the spaced-apart, side-by-side seats, wherein the center section including a plurality of upright members connected by upper and lower cross members to define the upper and lower end portions of the upright center section of the pet barrier frame, a plurality of crossbars secured to the center section of the pet barrier frame, the crossbars extending transversely to and beyond the upright center section of the pet barrier frame, said crossbars vertically spaced apart along the height of the center section of the pet barrier frame, the pet barrier cover comprising:

(a) a body portion sized and shaped to cover at least a portion of the pet barrier frame;
  (b) a first attachment member defined on the body portion, the first attachment member sized and configured to be releasably secured to one of the upper and lower end portions of the upright center section of the pet barrier frame;
  (c) a second attachment member defined on the body portion, the second attachment member sized and configured to be releasably secured to the other of the upper and lower end portions of the upright center section of the pet barrier frame;

(d) the body portion sized and shaped to overlie the upright center section of the pet barrier frame; and (e) a closure assembly configured to selectively secure the second attachment member to the pet barrier frame.

2. The cover for a pet barrier of claim 1, wherein the closure assembly is configured to secure the second attachment member in at least first and second positions to accommodate pet barrier frame center sections of various sizes.

3. The cover for pet barrier of claim 1, wherein the first attachment member is defined by a pocket receivable on one of the upper and lower end portions of the center section of the pet barrier frame.

4. The cover for a pet barrier of claim 1, wherein the second attachment member is defined by a flap extending from the body portion that is foldable over the other of the upper and lower end portions of the center section of the pet barrier frame.

5. The cover for a pet barrier of claim 4, wherein the closure assembly is configured to releasably secured the flap against the frame when the flap is folded over the other of the upper and lower end portions of the center section of the pet barrier frame.

6. The cover for a pet barrier of claim 5, wherein the closure assembly is defined by a first closure mechanism secured to the flap that is releasably securable a second closure mechanism secured to the body portion.

7. The cover for a pet barrier of claim 1, wherein the second attachment member is defined by a pocket receivable on one of the upper and lower end portions of the center section of the pet barrier frame.

8. The cover for a pet barrier of claim 7, wherein at least one of the first and second attachment members includes a selectively enlargeable opening.

9. The cover for a pet barrier of claim 8, wherein the closure assembly is configured to selectively close the opening.

10. A barrier assembly for dividing sections of a vehicle having spaced-apart, side-by-side seats, said barrier assembly comprising:

(a) a frame structure spanning between the side-by-side vehicle seats and overlapping the backs of the vehicle seats, said frame structure comprising:

(i) an upright center section extending between the spaced-apart, side-by-side vehicle seats, said upright center section comprising a plurality of upright members connected by upper and lower cross members to define upper and lower end portions of the upright center section of said frame structure; and (ii) a cross-section extending laterally from the center section of the barrier frame, said cross-section extending laterally relative to the upright center section of the barrier frame to terminate beyond said upright center section of the frame structure; and (b) a cover for covering at least a portion of the barrier frame structure, said cover comprising:

(i) a body portion sized and shaped to cover at least a portion of the upright center portion of said barrier frame structure;

(ii) a first attachment member defined on the body portion, the first attachment member size and configure to be releasably secured to one of the first upper and lower end portions of the center section of said barrier frame structure; and (iii) a second attachment member defined on the body portion, the second attachment member sized and configured to be releasably secured to the other of the upper and lower end portions of the center section of said barrier frame structure, wherein the second attachment member is securable in at least first and second positions to accommodate barrier frame center sections of various sizes.

11. The barrier assembly of claim 10, wherein said cover further comprising a closure assembly configured to secure the second attachment member in the at least first and second positions.

12. The barrier assembly of claim 10, wherein the first attachment member of said cover is defined by a pocket engagable over one of the upper and lower end portions of the upright center section of the barrier frame structure.

13. The barrier assembly of claim 10, wherein the second attachment member cover is defined by a flap extending from the body portion that is foldable over the other of the upper and lower end portions of the center section of the barrier frame structure.

14. The barrier assembly of claim 13, wherein the closure assembly of said cover is configured to releasably secure the flap against the frame when the flap is folded over the other of the upper and lower end portions of the center section of the barrier frame structure.

15. The barrier assembly of claim 14, wherein the closure assembly of said cover is defined by a first closure mechanism secured to the flap that is releasably securable a second closure mechanism secured to the body portion.

16. The barrier assembly of claim 10, wherein the second attachment member of said cover is defined by a pocket engagable over one of the upper and lower end portions of the upright center section of the barrier frame structure.

17. The barrier assembly of claim 16, wherein at least one of the first and second attachment members of said cover includes a selectively enlargeable opening.

18. The barrier assembly of claim 17, wherein the closure assembly of said cover is configured to selectively close the opening.

19. The barrier assembly of claim 10, wherein said the cross-section of said frame structure comprising a plurality of crossbars secured to the upright center section of the barrier frame structure, said crossbars extending transversely to and beyond the upright center section of the barrier frame structure, said crossbars space apart along the height of the upright center section of the barrier frame structure.

20. The barrier assembly of claim 19:

wherein said cross bars of said frame structure defining distal end portions, and said frame structure further comprising connection members interconnecting the distal end portions of said cross bars.

\* \* \* \* \*

UNITED STATES PATENT AND TRADEMARK OFFICE
CERTIFICATE OF CORRECTION

PATENT NO. : 8,573,664 B2  Page 1 of 1
APPLICATION NO. : 12/900168
DATED : November 5, 2013
INVENTOR(S) : Beechie It is certified that error appears in the above-identified patent and that said Letters Patent is hereby corrected as shown below:

| COLUMN | LINE | |
|---|---|---|
| 13
Claim 3 | 9 | "for pet barrier" should read --for a pet barrier-- |
| 13
Claim 5 | 19 | "secure" should read --secured-- |
| 13
Claim 6 | 25 | "securable" should read --securable to-- |
| 13
Claim 10 | 59 | "size and configure" should read --sized and configured-- |
| 14
Claim 19 | 50 | "space" should read --spaced-- |

Signed and Sealed this
Ninth Day of February, 2016

Michelle K. Lee
*Director of the United States Patent and Trademark Office*